United States Patent [19]

Hewes, Jr.

[11] 4,345,377

[45] Aug. 24, 1982

[54] DEHORNING TOOL

[76] Inventor: Francis W. Hewes, Jr., Toponas, Colo. 80479

[21] Appl. No.: 204,918

[22] Filed: Nov. 7, 1980

[51] Int. Cl.³ .............................................. B26B 17/02
[52] U.S. Cl. ........................................ 30/181; 30/192
[58] Field of Search ................ 30/181, 192, 191, 193, 30/180, 228, 245, 248

[56] References Cited

U.S. PATENT DOCUMENTS

| | | | |
|---|---|---|---|
| 335,796 | 2/1886 | Cullon | 30/245 X |
| 441,065 | 11/1890 | Green | 30/193 X |
| 774,142 | 11/1904 | Brick | 30/181 X |
| 844,518 | 2/1907 | Harden | 30/192 X |
| 2,743,522 | 5/1956 | Overhouse | 30/245 X |
| 4,028,971 | 6/1977 | Budrose | 30/191 X |

Primary Examiner—Jimmy C. Peters
Attorney, Agent, or Firm—Sheridan, Ross & McIntosh

[57] ABSTRACT

A dehorning tool has a tabular body with a lever arm pivotally mounted on the upper half and connected to an end of a actuating arm inside the body. The other end of the actuating arm is connected to the ends of two cutting blades. There are camming means inside of the blades to cam them open when the blades are extended and there are camming means on the outside of the blades which cam the blades together when the actuating lever is moved to retract the blades.

14 Claims, 7 Drawing Figures

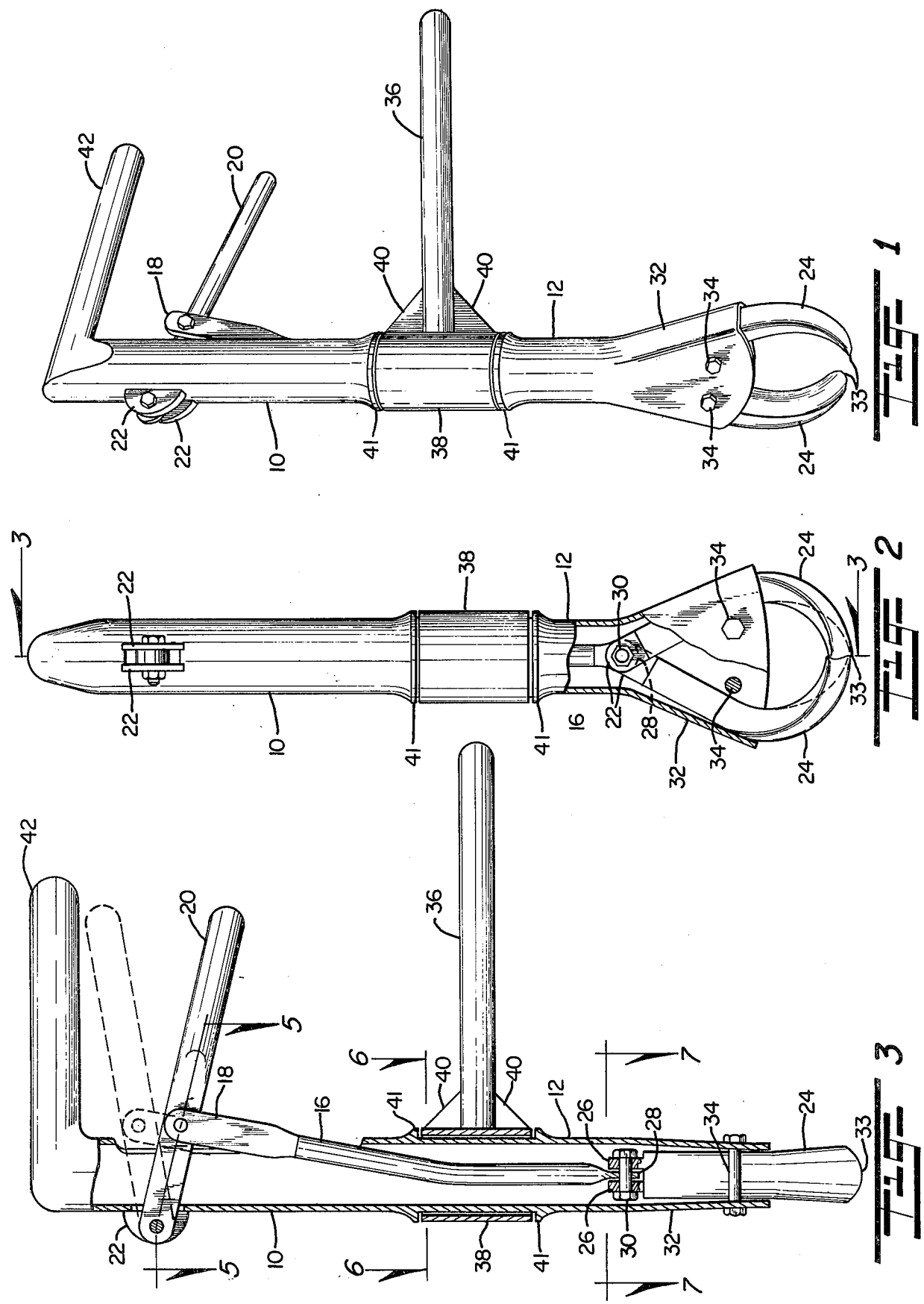

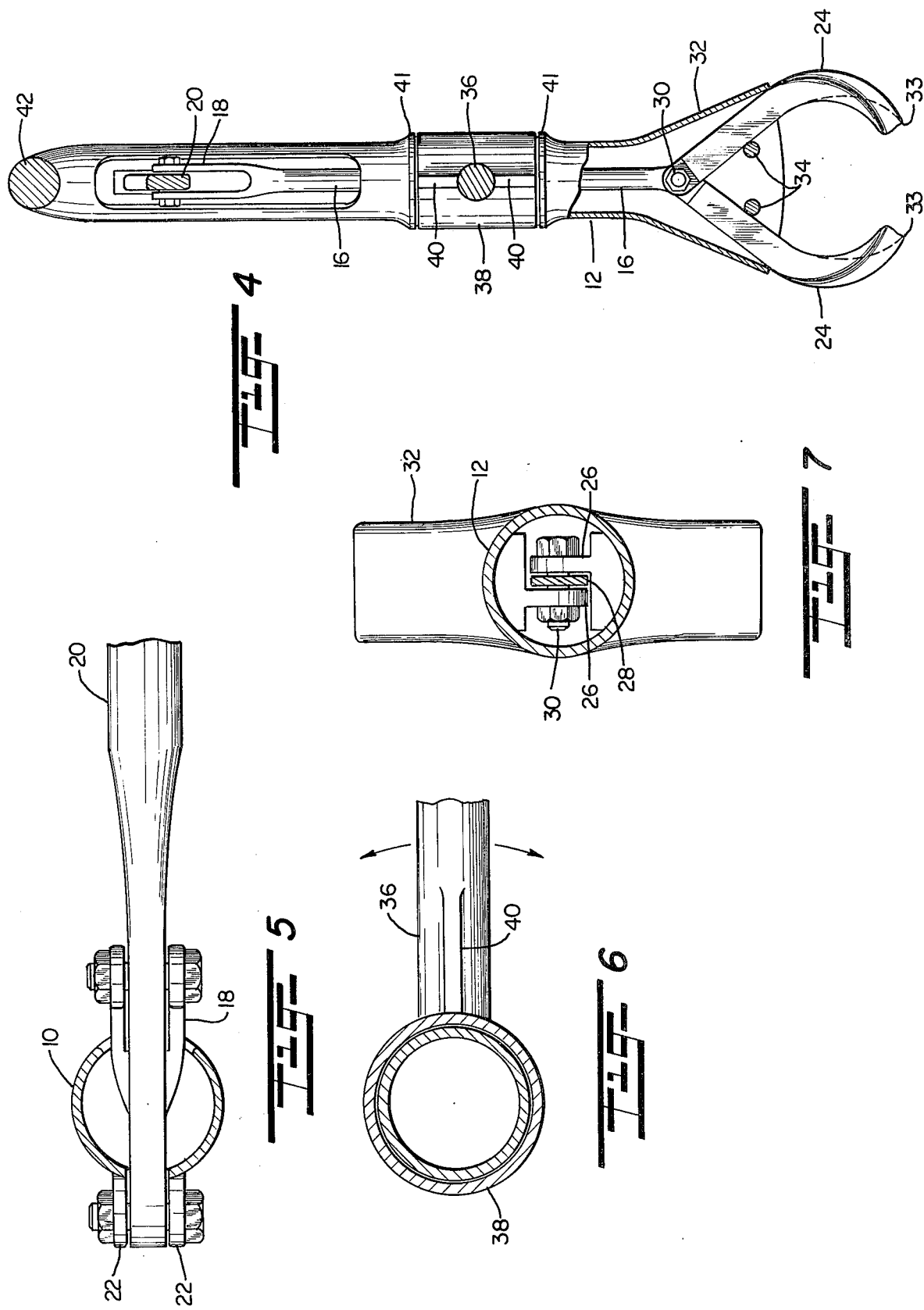

DEHORNING TOOL

DESCRIPTION

1. Technical Field

My invention lies in the field of veterinary instruments and particularly in the field of dehorning devices for severing the horns of animals.

2. Background Art

Saws have been the cheif dehorning tools of the past. Use of a dehorning saw is time-consuming and, accordingly, is difficult to use effectively on an animal which is being restrained. Furthermore, even a slight movement of the animal will destroy the accuracy of the cut. More sophisticated devices are somewhat subject to the same disadvantages.

During the dehorning procedure it is desirable to simultaneously sear or cauterize the wound left when the horn is severed to help prevent infection. This is practically impossible to do when a saw is used. It is difficult to accomplish with other dehorning tools available.

DISCLOSURE OF THE INVENTION

In accordance with the present invention a dehorning tool is provided having cutting blades hinged to an operator controlled actuating mechanism which operates to advance and retract the blades. Camming means are provided to effect opening of the blades as they move forward for insertion of their cutting edges around a horn and for closing the blades upon retraction for severing the horn. A handle is rotatably mounted on the body of the device to permit rotation of the body and cutting blades to aid in severing the horn.

The dehorning device has the advantage that it can be quickly and accurately placed over a horn on an animal and the blades rapidly forced together and rotated to sever the horn. Great force can be applied to the blades due to the leverage achieved by the construction of the device. A further advantage of the device is the fact that the blades can be heated before use either by direct contact with heat or electrically for searing or cauterizing the wound left after removal of the horn.

DESCRIPTION OF THE FIGURES

The details of the invention will now be described in connection with the accompanying drawing, in which FIG. 1 is a perspective side view of the dehorning tool;

FIG. 2 is a partial back cutaway view;

FIG. 3 is a side view shown with the outer casing cut away to show internal structure;

FIG. 4 is a partial front cutaway view;

FIG. 5 is a fragmentary cutaway view taken in the area of the handle on line 5—5 of FIG. 3;

FIG. 6 is a partial fragmentary cutaway view taken on line 6—6 of FIG. 3, and

FIG. 7 is a partial fragmentary cutaway view taken on line 7—7 of FIG. 3.

BEST MODE FOR CARRYING OUT THE INVENTION

In the following description and claims the end of the tool to which the lever arm and grip are attached is referred to as the top and the opposite end on which the cutting blades are mounted as the bottom. The term "proximal" refers to that part or area of an element nearest the top and the term "distal" refers to that part or area of the element further removed from the top than the proximal area. The front of the tool is defined by the side from which the gripping element and lever arm extend and the back and sides are correspondingly defined.

Referring now to the drawings, the dehorning tool of the invention comprises upper and lower housing sections 10 and 12, respectively, of tubular construction and forming the body 14 of the device. The body could be solid or of other construction. It is preferably made of metal but can be made of plastic or other suitable material.

An actuating arm 16 extends horizontally of the tubular body 14. It is attached at its proximal end by yoke 18 to lever arm 20 which is pivotally mounted by ears 22 to upper housing section 10 and hingedly attached at its distal end to cutting blades 24. The hinge construction comprises proximate ends 26 of cutting blades 24 mounted to tongue 28 of actuating arm 16 by means of bolt 30. It is seen from the description that movement of lever arm 20 in an upward direction withdraws the cutting blades 24 and movement of the lever arm in the downward direction extends them.

The bottom of lower housing section 12 ends in flared skirt 32 which permits the cutting blades 24 to move outwardly and cams them together as the cutting blades are moved inwardly.

For separating the cutting blades 24 to permit their cutting edges 33 to be placed over the animal horns, upstanding camming members or pins 34 are rigidly mounted between the sides of skirt 32 and internally of the cutting blades 24. From the described construction it will be seen that as actuating arm 16 is moved downwardly or outwardly the extending cutting blades 24 will be cammed apart by the camming pins 34 to open the cutting edges 33 to permit their placement about the animal horn. It will be further seen that as the actuating arm 16 is moved upwardly the withdrawing cutting blades 24 will be cammed by the inner sides or surfaces of flared skirt 32 to close the cutting edges 33 to sever the horn.

The cutting edges 33 are preferably of concave construction but can be of other configuration. Obviously, more than two cutting blades can be used and hingedly mounted on the distal end of actuating arm 16 by well known construction. Other means than skirt 32 and pins 34 can be used for camming the cutting blades to closed and open positions.

The dehorning tool is held by the operator by handle 36 rigidly attached to hollow sleeve 38 by means of welds 40. The sleeve 38 is rotatable on body member 14 between supporting annular flanges 41 to permit rotation of body 14 and, accordingly, cutting edges 33 to aid in severing the horn after the edges have been closed on it.

A gripping member 42 is rigidly attached to the top of body member 14 to aid the operator in moving lever arm 20 upwardly to close the cutting edges 33 about the horn. It is seen that the described construction provides increased leverage through lever arm 20 and actuating arm 16 to provide maximum force to close cutting edges 33 with a minimum force applied to lever arm 20. The cutting blades 24 will normally fall open by gravity when the tool is in upright position but, if necessary, they can be opened by moving lever arm 20 downwardly.

The preferred metal construction of the dehorning tool permits the cutting edges 33 to be heated by direct contact with a heat source, electrically, or by other means to permit simultaneous severing of the horn and searing or cauterizing of the wound left by removal of the horn to prevent infection. The dehorning tool may be used for dehorning cattle, sheep or other animals.

What is claimed is:

1. In a dehorning tool for severing animal horns including a hollow body, at least two cutting blades hingedly supported at one of their ends in said hollow body extending outside said body and having cutting edges on their outside free ends, means for moving the free ends of said cutting blades apart to permit placement of their cutting edges on the outside of an animal horn, and means for moving said free ends together for severing the horn with said cutting edges, the improvement which comprises actuating means including first immovable camming means located inside of said cutting blades for simultaneously extending and opening said cutting blades as their inner surfaces cam against said first immovable camming means for placement of said cutting edges on the outside of said horn, and actuating means including second camming means for simultaneously retracting and closing said cutting blades for severing said horn with said cutting edges.

2. The dehorning tool of claim 1 in which said second camming means extend along the outside of said cutting blades and is adapted to cam the outer surfaces of said cutting blades to close the cutting blades as they are retracted and force their cutting edges together.

3. The dehorning tool of claim 2 in which said second camming means comprises outwardly angled surfaces supported at the distal end of said body.

4. The dehorning tool of claim 2 in which said first camming means comprises at least one rigid member upstanding from its support.

5. The dehorning tool of claim 1 in which said actuating means includes a lever arm pivotally mounted near the top of said body and an actuating arm extending longitudinally of said body and having its proximal end attached to said lever arm and its distal end attached to or near the hinge point of said cutting blades so that movement of said lever arm effects extension and retraction of said cutting blades.

6. The dehorning tool of claim 5 in which said actuating means also includes first immovable camming means positioned inside of said cutting blades adapted to cam the inner surfaces of said cutting blades to open them as they are extended by movement of said actuating arm in one direction and force their cutting edges apart, and second camming means extending along the outside of said cutting blades adapted to cam the outer surfaces of said cutting blades to close them and force their cutting edges together as they are retracted by the movement of said actuating arm in the other direction.

7. The dehorning tool of claim 6 including a handle rotatably mounted on said body.

8. The dehorning tool of claim 7 including a gripping element mounted on said body above said lever arm.

9. A dehorning tool for severing the horns of animals comprising a tubular body, a lever arm pivotally mounted on the upper half of said body, an actuating arm extending longitudinally inside said tubular body having its proximal end attached to said lever arm for movement therewith, at least two cutting blades hingedly attached at one of their ends to the distal end of said actuating arm and having cutting edges at their other ends so that movement of said actuating arm in one direction extends said cutting blades, and movement of said actuating arm in the other direction retracts said cutting blades, first immovable camming means located inside said blades for camming them open as said actuating lever is moved in one direction to extend said cutting blades and separate their cutting edges and second camming means extending along the outside of said cutting blades for camming them together to bring their cutting edges together when said actuating lever is moved in the opposite direction to retract said cutting blades.

10. The dehorning tool of claim 9 in which said second camming means comprises outwardly angled surfaces at the bottom of said body.

11. The dehorning tool of claim 10 in which said first camming means comprises at least one rigid member upstanding from its point of attachment.

12. The dehorning tool of claim 9 including a handle rotatably mounted on said body.

13. The dehorning tool of claim 12 including a gripping element located above said lever arm.

14. The dehorning tool of claim 13 in which said body terminates at its bottom in an outwardly flared skirt the internal surfaces of which form camming surfaces for the outer surfaces of said cutting blades and, said skirt supporting said rigid members.

* * * * *